(12) United States Patent
Ebrahimi Afrouzi et al.

(10) Patent No.: US 11,709,047 B1
(45) Date of Patent: Jul. 25, 2023

(54) REMOTE DISTANCE ESTIMATION SYSTEM AND METHOD

(71) Applicants: Ali Ebrahimi Afrouzi, San Diego, CA (US); Soroush Mehrnia, Helsingborg (SE)

(72) Inventors: Ali Ebrahimi Afrouzi, San Diego, CA (US); Soroush Mehrnia, Helsingborg (SE)

(73) Assignee: AI Incorporated, Toronto (CA)

( * ) Notice: Subject to any disclaimer, the term of this patent is extended or adjusted under 35 U.S.C. 154(b) by 865 days.

(21) Appl. No.: 16/525,137

(22) Filed: Jul. 29, 2019

Related U.S. Application Data

(63) Continuation of application No. 15/257,798, filed on Sep. 6, 2016, now Pat. No. 10,408,604.

(60) Provisional application No. 62/215,088, filed on Sep. 7, 2015.

(51) Int. Cl.
*G01B 11/14* (2006.01)

(52) U.S. Cl.
CPC .................................... *G01B 11/14* (2013.01)

(58) Field of Classification Search
CPC ... G01S 17/00; G01S 17/46; G01S 7/48; G01S 7/481; G01S 7/486; G01B 11/14
See application file for complete search history.

(56) References Cited

U.S. PATENT DOCUMENTS

| | | | | |
|---|---|---|---|---|
| 4,867,570 A * | 9/1989 | Sorimachi et al. | ...... | G01S 17/48 356/603 |
| 5,054,912 A | 10/1991 | Kuchel | | |
| 5,175,601 A * | 12/1992 | Fitts | .................. | G01B 11/2513 250/237 G |
| 5,257,060 A * | 10/1993 | Kotani et al. | ............ | G02B 7/32 396/109 |
| RE34,749 E * | 10/1994 | Leong et al. | ...... | G01B 11/2545 250/237 G |
| 6,271,918 B2* | 8/2001 | Blais | ....................... | G01C 3/14 356/625 |
| 6,545,749 B1 | 4/2003 | Andersson | | |
| 6,707,027 B2* | 3/2004 | Liess et al. | .......... | G01S 7/4916 345/157 |
| 6,847,435 B2 | 1/2005 | Honda et al. | | |
| 7,187,452 B2 | 3/2007 | Jupp et al. | | |

(Continued)

*Primary Examiner* — Luke D Ratcliffe

(57) ABSTRACT

Provided is a tangible, non-transitory, machine readable medium storing instructions that when executed by the image processor effectuates operations including: capturing, with a first image sensor, a first image of at least two light points projected on a surface by the at least one laser light emitter; extracting, with at least one image processor, a first distance between the at least two light points in the first image in a first direction; and estimating, with the at least one image processor, a first distance to the surface on which the at least two light points are projected based on at least the first distance between the at least two light points and a predetermined relationship relating a distance between at least two light points in the first direction and a distance to the surface on which the at least two light points are projected.

19 Claims, 8 Drawing Sheets

(56) References Cited

U.S. PATENT DOCUMENTS

| | | | |
|---|---|---|---|
| 7,796,782 | B1 | 9/2010 | Motamedi et al. |
| 7,889,324 | B2 | 2/2011 | Yamamoto |
| 7,995,799 | B2 | 8/2011 | Schultz et al. |
| 8,212,994 | B2* | 7/2012 | Liu .................... E03D 5/105 356/3.01 |
| 8,558,993 | B2 | 10/2013 | Newbury et al. |
| 2002/0097404 | A1* | 7/2002 | Waslowski et al. .... G01S 17/48 356/623 |
| 2005/0280802 | A1 | 12/2005 | Liu |
| 2005/0285024 | A1* | 12/2005 | Eubelen ................ G01S 7/486 250/221 |
| 2009/0206158 | A1* | 8/2009 | Thuries et al. ..... H04N 5/23212 235/454 |
| 2010/0305418 | A1* | 12/2010 | Deliwala ............... G01S 17/87 600/324 |

\* cited by examiner

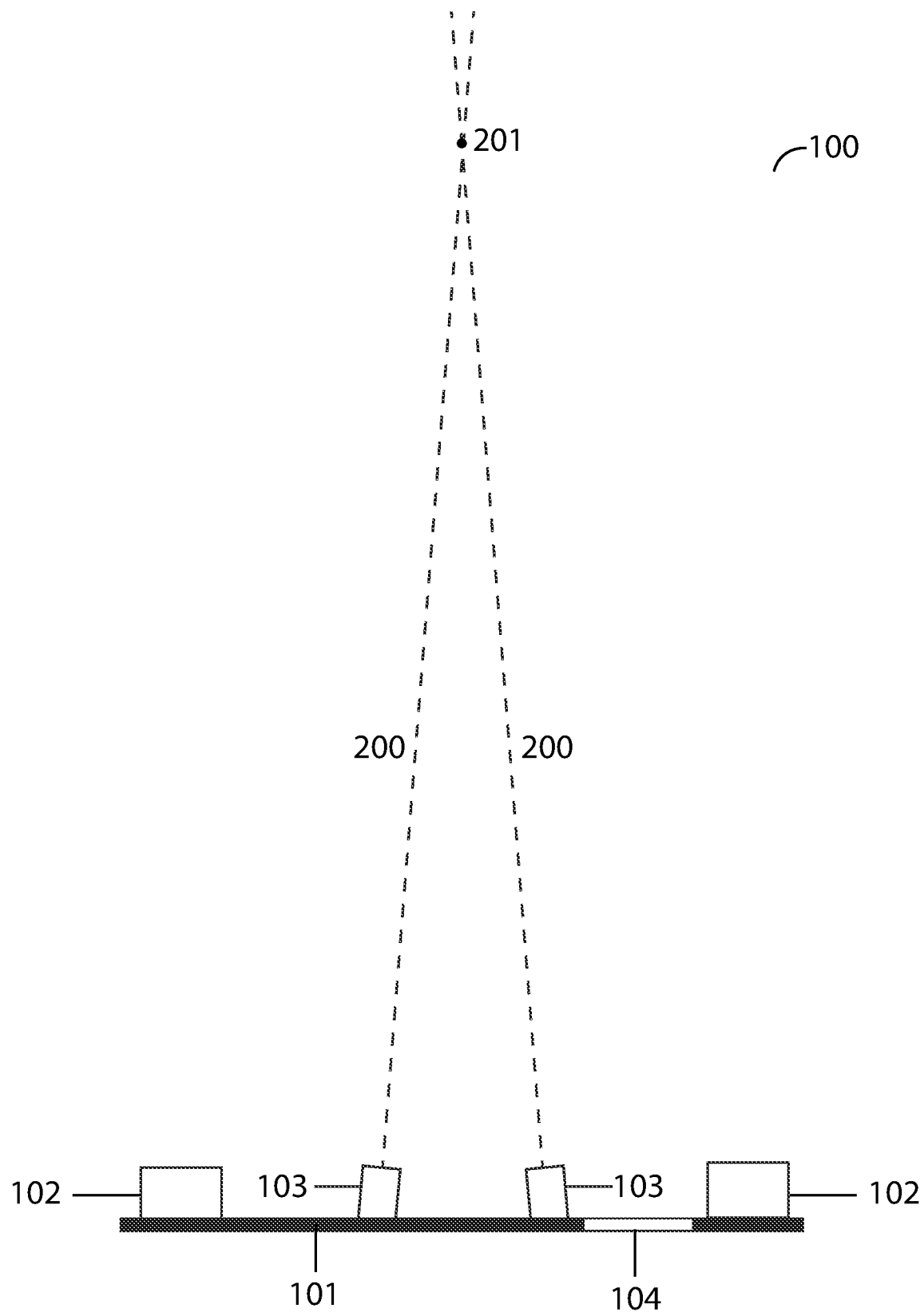

FIG. 6D
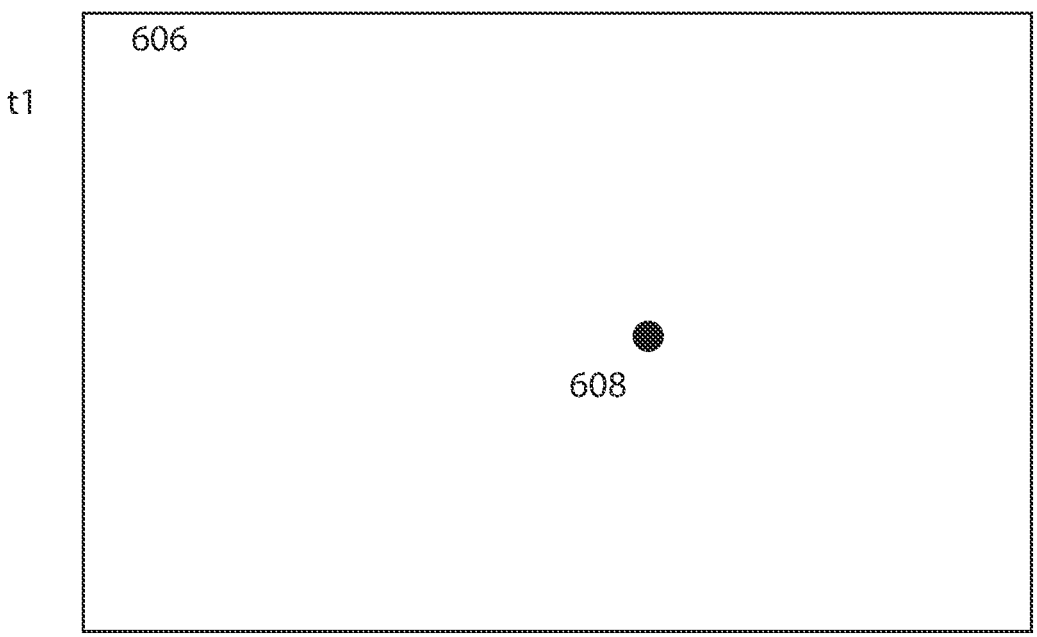
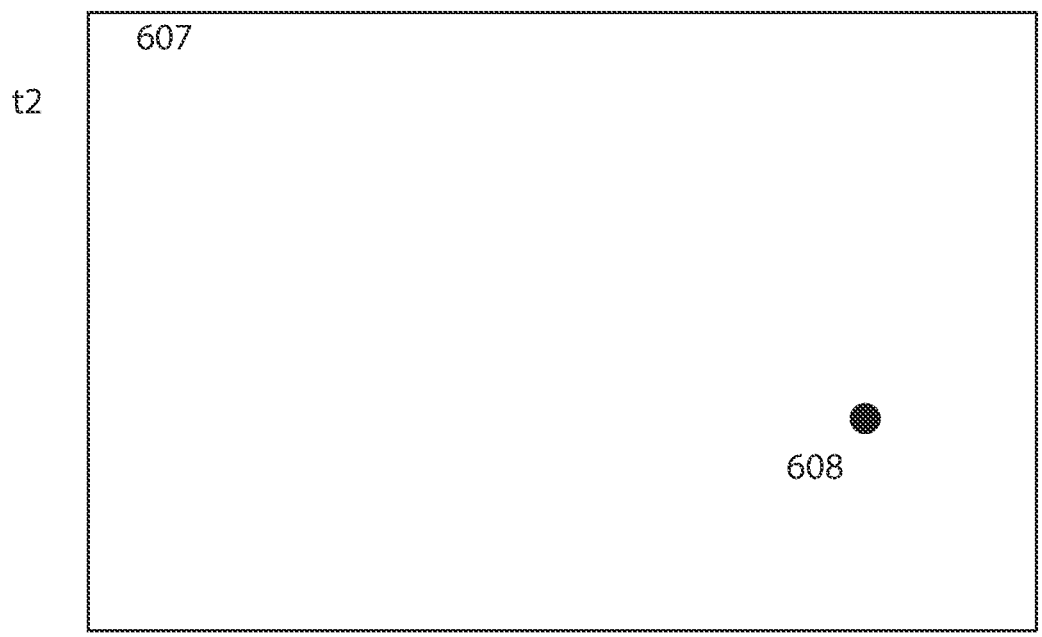

REMOTE DISTANCE ESTIMATION SYSTEM AND METHOD

CROSS-REFERENCE TO RELATED APPLICATIONS

This application is a Continuation of Non-Provisional Patent Application No. 15/257,798, filed Sep. 6, 2016, which claims the benefit of the Provisional Patent Application No. 62/215,088, filed Sep. 7, 2015.

FIELD OF THE DISCLOSURE

This disclosure relates to methods for remote distance estimation.

BACKGROUND

Mobile robotic devices are increasingly used in a variety of industries for executing different tasks with minimal or no human interactions. Such devices rely on various sensors to navigate through their environment and avoid driving into obstacles.

Infrared sensors, sonar, and laser range finders are some of the sensors used in mobile robotic devices. Infrared sensors typically have a low resolution and are very sensitive to sunlight. Infrared sensors that use a binary output can determine whether an object is within a certain range, but are unable to accurately determine the distance to the object. Sonar systems rely on ultrasonic waves instead of light. Under optimal conditions, sonar systems can be very accurate, however, sonar systems have limited coverage areas; if used in an array, they can produce cross-talk and false readings; if they are installed too close to the ground, signals can bounce off the ground, degrading accuracy; and sound-absorbing materials in the area can produce erroneous readings.

Laser Distance Sensors (LDS) are a very accurate method for measuring distance that can be used on robotic devices, but, due to their complexity and cost, these sensors are typically not a suitable option for robotic devices intended for day-to-day home use.

A need exists for a more accurate and reliable, yet affordable method for remotely estimating distances.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a distance estimation system, including: at least one laser light emitter; at least one image sensor; at least one image processor; and a tangible, non-transitory, machine readable medium storing instructions that when executed by the image processor effectuates operations including: capturing, with a first image sensor, a first image of at least two light points projected on a surface by the at least one laser light emitter; extracting, with the at least one image processor, a first distance between the at least two light points in the first image in a first direction; and estimating, with the at least one image processor, a first distance to the surface on which the at least two light points are projected based on at least the first distance between the at least two light points and a predetermined relationship relating a distance between at least two light points in the first direction and a distance to the surface on which the at least two light points are projected.

Provided is a distance estimation device, including: at least one laser light emitter; at least one image sensor; at least one image processor; and a tangible, non-transitory, machine readable medium storing instructions that when executed by the image processor effectuates operations including: capturing, with a first image sensor, a first set of images of at least one light point projected on a surface by the at least one laser light emitter; extracting, with the at least one image processor, the at least one light point in the first set of images using pixel data; determining, with the at least one image processor, a first change in position of the at least one light point in consecutively captured images of the first set of images; and estimating, with the image processor, a first distance to the surface on which the at least one light point is projected based on at least the first change in position of the at least one light point and a predetermined relationship relating a change in position of a light point and a distance to the surface on which the light point is projected.

BRIEF DESCRIPTION OF DRAWINGS

FIG. 2 illustrates an overhead view of the distance estimation device, according to some embodiments.

FIG. 6D illustrates images captured by an image sensor, according to some embodiments.

DETAILED DESCRIPTION OF SOME EMBODIMENTS

Figure 1A:
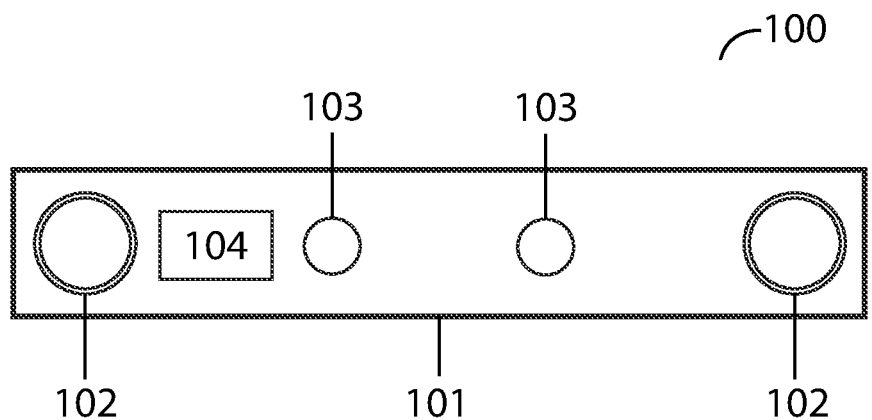
FIG. 1A illustrates a front elevation view of the distance estimation device, according to some embodiments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Various embodiments are described herein below, including methods and techniques. It should be kept in mind that embodiments might also cover articles of manufacture that include a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, embodiments may also cover apparatuses for practicing embodiments. Such apparatus may include circuits, dedicated and/or programmable, to carry out tasks pertaining to embodiments. Examples of such apparatus include a specialized computer and/or a dedicated computing device when appropriately programmed and may include a combination of a computer/computing device and dedicated/programmable circuits adapted for the various tasks pertaining to embodiments. The disclosure described herein is directed generally to one or more processor-automated methods and/or systems that estimate distance of an object, also known as distance estimation systems.

Some embodiments include a distance estimation system comprised of at least: two converging laser light emitters disposed on a baseplate, a first image sensor disposed on the baseplate, and an image processor for extracting image data. Each laser light emitter emits a collimated laser beam. The laser light emitters shall be positioned such that the laser beams coincide at a predetermined distance from the baseplate. As a result, two areas, hereinafter referred to as light points or projected light points, will be illuminated on surfaces that are substantially opposite the emitter, up until the point where the laser beams coincide, at which point only one area will be illuminated. Beyond that point, the laser beams will diverge, and once again, two light points will be projected. The first image sensor shall be positioned such that the field of view thereof captures the projected light point or points within a predetermined range of distances. In some embodiments, the image sensor is configured to iteratively capture images at predetermined intervals.

In some embodiments, images captured by the image sensor are sent to the image processor, which extracts data of the light point or points. Using computer vision technology, the image processor extracts the distance (if any) between the two points. If only one light point is detected, the distance extracted will be zero. In some embodiments, this distance is compared to figures in a preconfigured table that relates distances between light points with distances between the baseplate and surfaces upon which the light points are projected (which may be referred to as 'projection surfaces' herein) to find an estimated distance between the baseplate and the projection surface at the time the image being analyzed was captured.

In some embodiments, the preconfigured table is constructed from actual measurements of distances between the light points in images captured at predetermined increments in a predetermined range of distances between the baseplate and projection surfaces.

In some embodiments, a second image sensor is provided on the baseplate in a position mirroring the first image sensor. The process described above of iteratively capturing images of the one or two light points and analyzing the distance (if any) between them is repeated with images from the second image sensor. The image sensors are configured to capture images simultaneously so that the distance between the baseplate and projection surface is the same at the time of the capture of each image. The mean of the distances between light points from the images of each image sensor is found and this figure is compared to figures in the preconfigured table that relates distances between light points with distances between the baseplate and projection surfaces to find an estimated distance between the baseplate and the projection surface at the time of the capture of the images. A second image sensor, therefore, serves to improve the accuracy of the estimation.

In some embodiments, the two laser light emitters emit laser beams with different wavelengths such that the beams may be distinguished from each other. This may double the effective range of the distance estimation system as the image sensors are able to distinguish the light points from each other and thus detect when the laser beams are diverging (after coinciding). After the laser beams coincide, they will continue along their trajectory and diverge. The laser light beam that is emitted from the right side emitter will be on the left side after the point of convergence and the laser light beam that is emitted from the left side emitter will be on the right side after the point of convergence. By identifying that the light beams have switched places, the system can account for the change. (In contrast, in some embodiments wherein the laser beams are indistinguishable, the system is only effective within the range of distances up to and at the point where the laser beams coincide, after which point the distance between the light points will increase from 0, but the system will have no way to distinguish these distances from the equivalent distances that will be measured between the light points before the point of convergence.)

In some embodiments, the laser light emitters are positioned at different heights on the baseplate. The laser beams will still converge, but the light points will move in a vertical plane in addition to horizontal plane of the image as the distance to the projection surface changes. This additional data will serve to make the system more accurate.

In some embodiments, the laser light emitters are positioned at a downward or upward angle with respect to a horizontal plane. The laser beams will still converge, but, in a similar manner as previously described, the light points will move in a vertical plane in addition to a horizontal plane of the image as the distance to the projection surface changes. This additional data will serve to make the system more accurate.

Some embodiments include a distance tracking system in which a single laser light emitter is provided in the corner of a baseplate, positioned such that the emitted collimated laser beam is angled toward the opposite corner of the baseplate. An image sensor is positioned on the baseplate in the corner opposite of the laser light emitter such that the field of view thereof captures the projected light point within a predetermined range of distances. In some embodiments, the image sensor is configured to iteratively capture images at predetermined intervals. Images captured by the image sensor are sent to an image processor, which extracts data of the light point. In some embodiments, images may be compared to each other in order to track the change in distance to the projection surface. For example, the coordinates of the light point in an image taken at time 1 may be compared to the coordinates of the light point in an image taken at time 2 to determine the change in distance to the projection surface from time 1 to time 2.

Figure 1B:
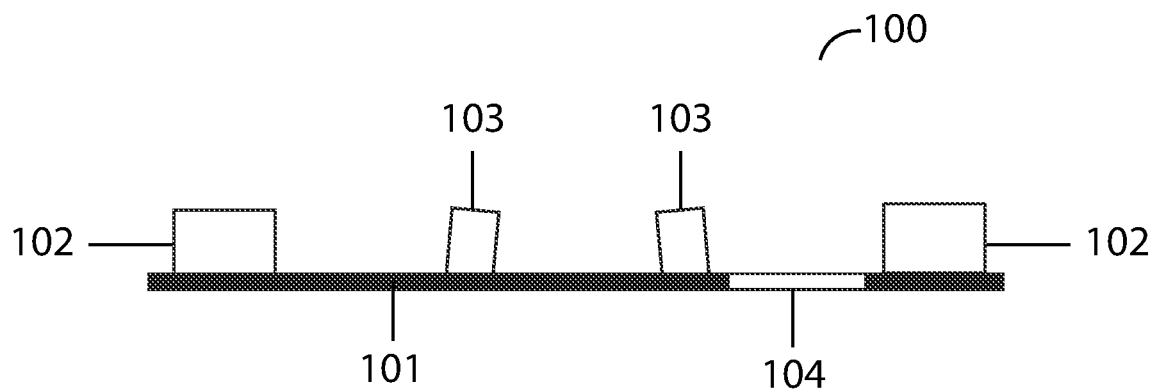
FIG. 1B illustrates an overhead view of the distance estimation device, according to some embodiments.

FIG. 1A illustrates a front elevation view of distance estimation device 100. Distance estimation device 100 includes baseplate 101, image sensors 102, laser light emitters 103, and image processor 104. As mentioned previously, only one image sensor is necessary for distance estimation, however additional image sensors may improve accuracy. For illustrative purposes, two image sensors are shown in this example. The laser light emitters are positioned with a slight inward angle toward each other, with the point of convergence being a predetermined distance from the baseplate. The one or more image sensors shall be positioned such that the fields of view thereof will capture laser projections of the laser light emitters within a predetermined range of distances. FIG. 1B illustrates an overhead view of distance estimation device 100. Distance estimation device 100 includes baseplate 101, image sensors 102, laser light emitters 103, and image processor 104.

FIG. 2 illustrates an overhead view of distance estimation device 100. Laser light emitters 103 are disposed on baseplate 101 and emit collimated laser light beams 200, which converge at point 201. Image sensors 102 are located on either side of the laser light emitters. Image processor 104 is located within baseplate 101. As discussed previously, in some embodiments, the maximum effective distance of the estimation device is at the point where the laser beams coincide. In other embodiments, using different wavelengths in each laser light emitter will allow the image processor to recognize the distances between the light points after the point of convergence as being further from the baseplate than the identical distances between the light points that will occur before the point of convergence. In distances beyond point 201, the laser beam from the right-most laser emitter will appear on the left side, and the laser beam from the left-most laser emitter will appear on the right side. Upon identifying the switch in locations of the laser beams, the image processor will determine that the extracted distance is occurring after the point of convergence.

Figure 3:
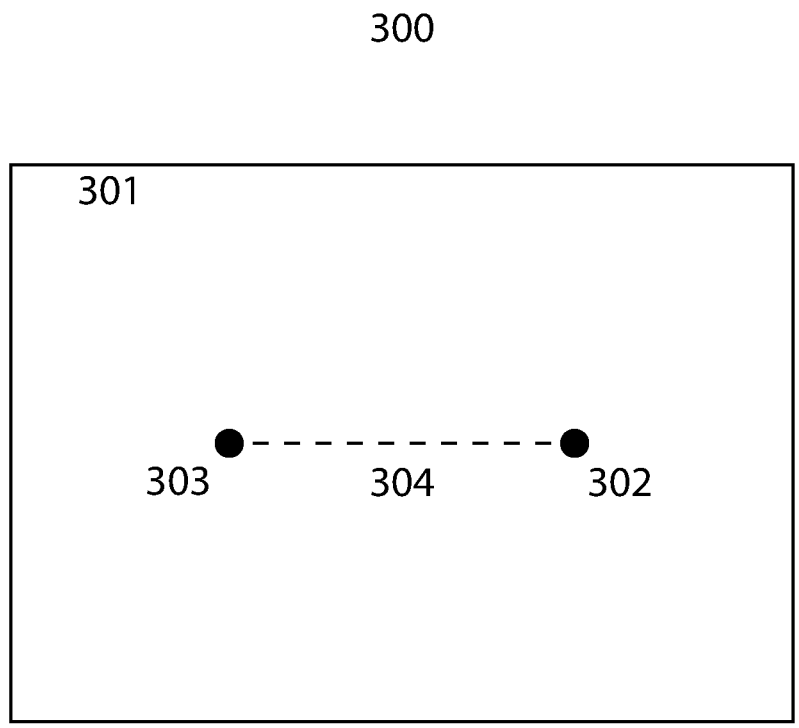
FIG. 3 illustrates an image captured by an image sensor, according to some embodiments.

The one or more image sensors simultaneously and iteratively capture images at discrete time intervals. FIG. 3 illustrates an image 300 captured by an image sensor 102 (in FIG. 2). Rectangle 301 represents the field of view of image sensor 102. Points 302 and 303 represent the light points projected by the laser light emitters 103 (in FIG. 2). As the distance of the baseplate to projection surfaces increases, the light points 302, 303 will appear closer and closer together until the distance between them is null, after which point the light points will diverge from each other. Thus, the distance 304 between the two points may be analyzed to determine the distance to the projection surface at the time that an image is captured. The image 301 is sent to the image processor, which extracts the distance 304 between the two points (if any). The distance 304 is then compared to figures in a preconfigured table that co-relates distances between light points in the system with distances between the baseplate and projection surfaces to find an estimate of the actual distance from the baseplate to the projection surface at the time the image of the laser light projections was captured.

In some embodiments, the process of capturing an image, sending it to an image processor, and extracting the distance between the light points is performed simultaneously using a second image sensor, and the data extracted from images from the first image sensor is combined with the data extracted from the second image sensor to obtain a more accurate aggregate reading before consulting the preconfigured table.

Figure 4A:
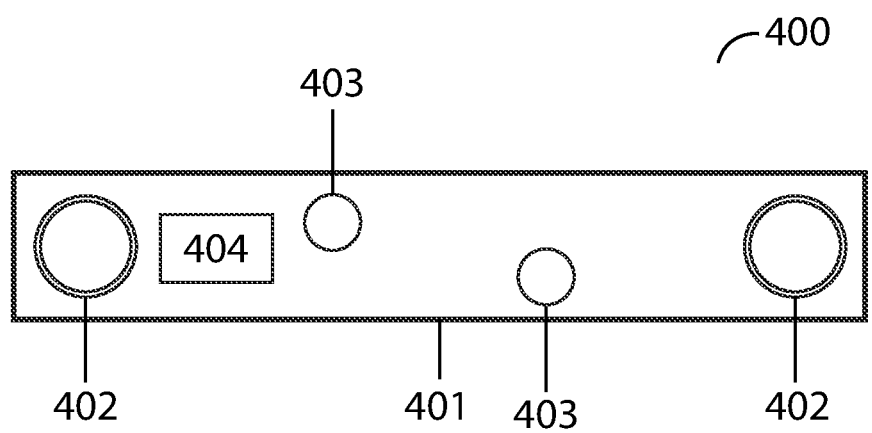
FIG. 4A illustrates a front elevation view of a distance estimation device with laser light emitters at different heights, according to some embodiments.
Figure 4B:
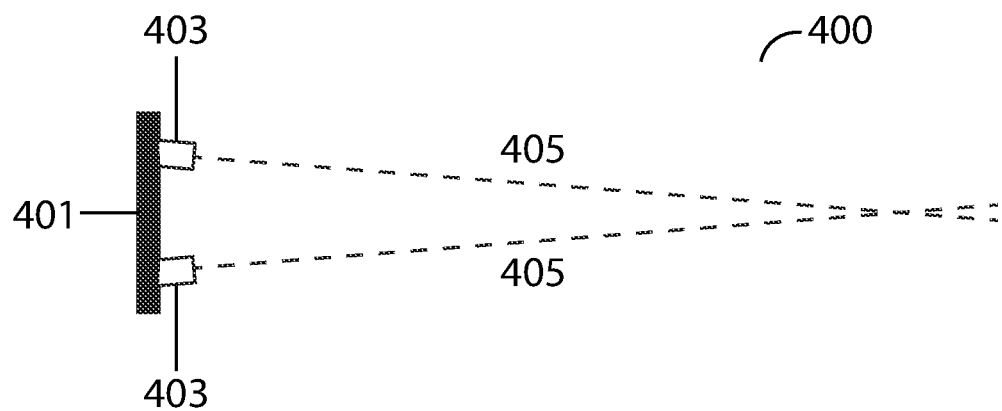
FIG. 4B illustrates a side elevation view of a distance estimation device with laser light emitters at different heights, according to some embodiments.
Figure 4C:
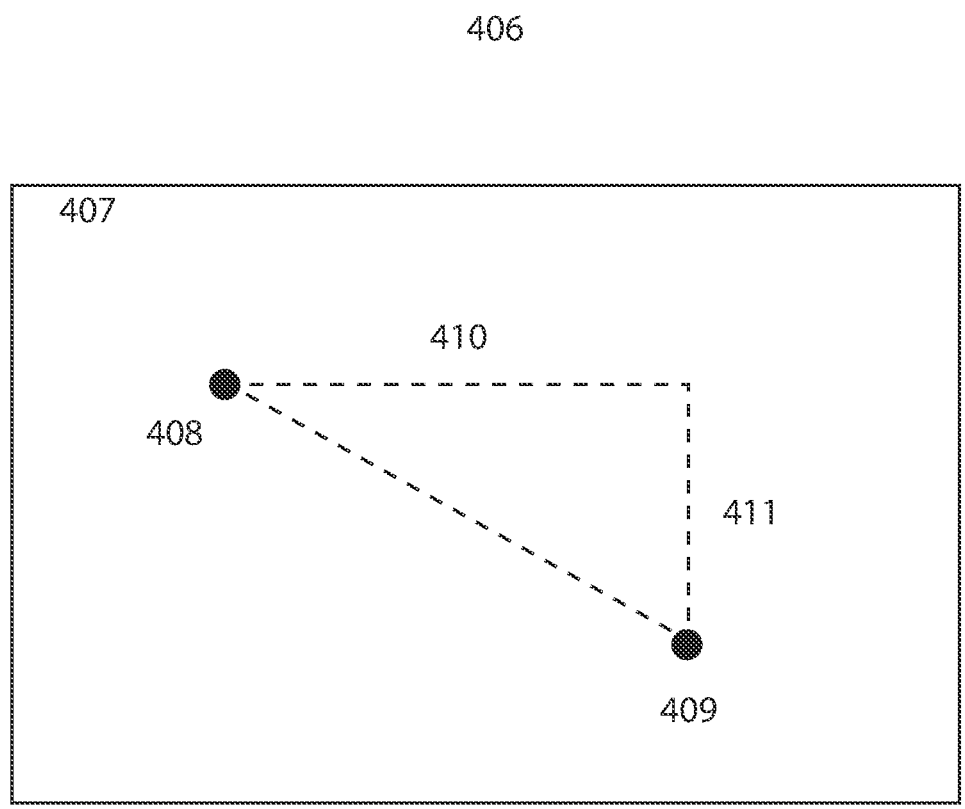
FIG. 4C illustrates an image captured by an image sensor, according to some embodiments.

FIG. 4A illustrates an embodiment of the distance estimation device 400 with laser light emitters 403 positioned at different heights on the baseplate 401. Image sensors 402 and image processor 404 are laid out in the same fashion as described in previous embodiments. The laser beams will still converge, but the light points will move in a vertical plane in addition to a horizontal plane of captured images as the distance to the projection surface changes. This additional data will serve to make the system more accurate. FIG. 4B shows a side view of the distance estimation device 400 wherein the laser beam emissions 405 can be seen converging in a vertical plane. (The image sensors and image processor have been omitted from FIG. 4B in order to not unnecessarily obscure the laser light emitters.) FIG. 4C illustrates an image 406 captured by image sensor 402. Rectangle 407 represents the field of view of image sensor 402. Points 408 and 409 represent the light points projected by the laser light emitters 403. The horizontal distance 410 and vertical distance 411 between the two points may each be analyzed to determine the distance to the projection surface at the time that the image 406 is captured. The image 406 is sent to the image processor, which extracts the horizontal distance 410 and vertical distance 411 between the two points (if any). Each distance 410 and 411 is then compared to figures in a corresponding preconfigured table that co-relates horizontal and vertical distances between light points, respectively, with distances between the baseplate and projection surfaces to find an estimate of the actual distance from the baseplate to the projection surface at the time the image of the laser light projections was captured.

Figure 5A:
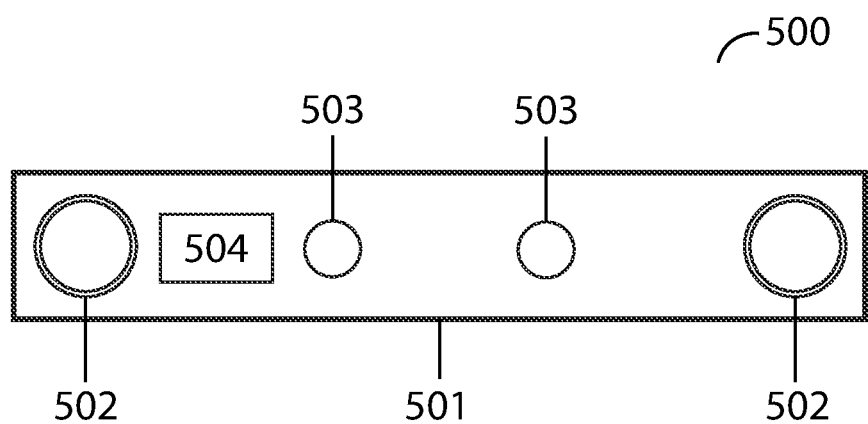
FIG. 5A illustrates a front elevation view of a distance estimation device with laser light emitters positioned at a downward angle, according to some embodiments.
Figure 5B:
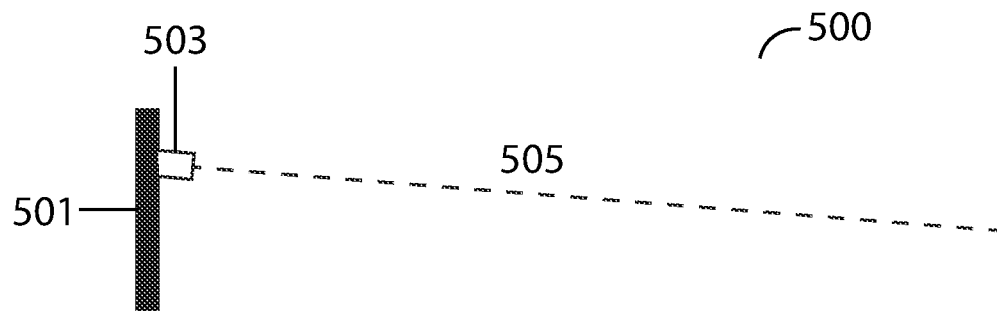
FIG. 5B illustrates a side elevation view of a distance estimation device with laser light emitters positioned at a downward angle, according to some embodiments.

FIG. 5A illustrates an embodiment of the distance estimation device 500 with laser light emitters 503 positioned on baseplate 501 at a downward angle with respect to a horizontal plane. Image sensors 502 and image processor 504 are laid out in the same fashion as described in previous embodiments. The laser beams will still converge, but, in a similar manner as previously described, the light points will move in a vertical plane in addition to a horizontal plane of the image as the distance to the projection surface changes. This additional data will serve to make the system more accurate. FIG. 5B shows a side view of the distance estimation device 500 wherein the laser beam emissions 505 can be seen angled downward. (The image sensors and image processor have been omitted from FIG. 5B in order to not unnecessarily obscure the laser light emissions.)

Figure 6A:
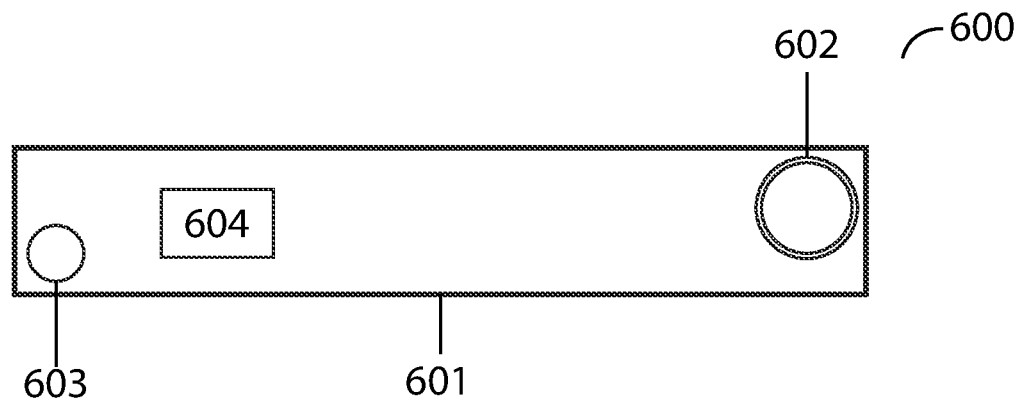
FIG. 6A illustrates a front elevation view of a distance tracking device, according to some embodiments.
Figure 6B:
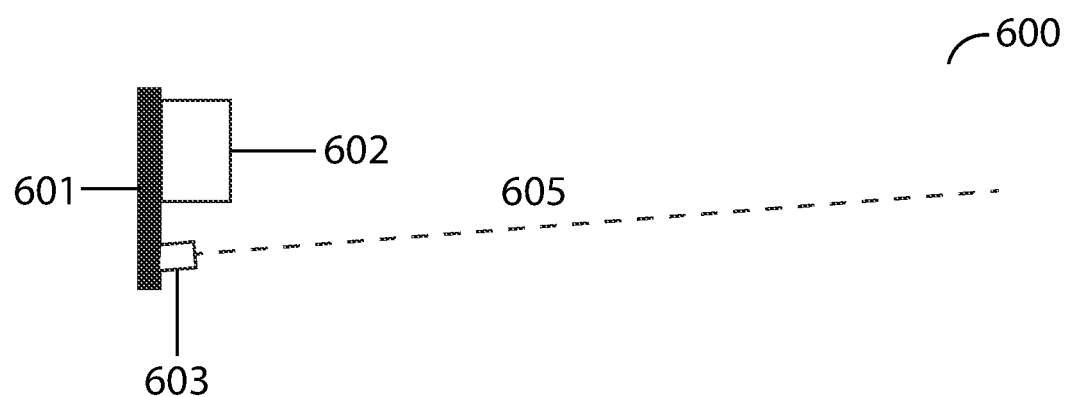
FIG. 6B illustrates a side elevation view of a distance tracking device, according to some embodiments.
Figure 6C:
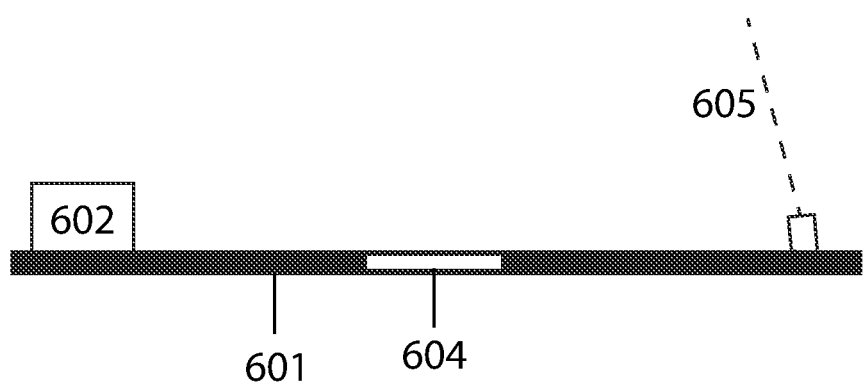
FIG. 6C illustrates an overhead view of a distance tracking device, according to some embodiments.

FIGS. 6A, 6B and 6C illustrate a distance tracking device 600. A laser light emitter 603 is positioned in first corner of baseplate 601 and an image sensor 602 is positioned in a second corner of the baseplate opposite the first corner. An image processor 604 is also disposed on the baseplate. FIG. 6A illustrates a front elevation view of the distance tracking device 600. FIG. 6B illustrates a side elevation view of the distance tracking device 600. From this angle, the y-axis movement of the laser beam emissions 605 can be seen. FIG. 6C illustrates an overhead view of the distance tracking device 600. From this angle, the x-axis movement of the laser beam emissions 605 can be seen. The image sensor iteratively captures images at predetermined intervals and sends the images to the image processor, which extracts data of the light point. Images may be compared to each other in order to track the change in distance to the projection surface. For example, the coordinates of the light point in an image taken at time 1 may be compared to the coordinates of the light point in an image taken at time 2 to determine the change in distance to the projection surface from time 1 to time 2. FIG. 6D illustrates a set of images including images 606 and 607 of a light point 608 emitted by laser light emitter 603 onto a projection surface at time 1 and time 2, respectively. The image processor 604 extracts a position of the light point 608 in image 606 and 607 and estimates a change in distance to the projection surface between time 1 and time 2, respectively.

In some embodiments, the distance estimation device further includes a band-pass filter to limit the allowable light.

In some embodiments, the baseplate and components thereof are mounted on a rotatable base so that distances may be estimated in 360 degrees of a plane.

In some embodiments, the image processor uses pixel data of an image, such as pixel brightness, to locate the light points captured in the image.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A distance estimation system, comprising:
    at least one laser light emitter;
    at least one image sensor;
    at least one image processor; and
    a tangible, non-transitory, machine readable medium storing instructions that when executed by the image processor effectuates operations comprising:
        capturing, with a first image sensor, a first image of at least two light points projected on a surface by the at least one laser light emitter;
        extracting, with the at least one image processor, a first distance between the at least two light points in the first image in a first direction;
        estimating, with the at least one image processor, a first distance to the surface on which the at least two light points are projected based on at least the first distance between the at least two light points and a predetermined relationship relating a distance between at least two light points in the first direction and a distance to the surface on which the at least two light points are projected;
        extracting, with the at least one image processor, a second distance between the at least two light points in the first image in a second direction;
        estimating, with the at least one image processor, a second distance to the surface on which the at least two light points are projected based on the second distance between the at least two light points and another predetermined relationship relating a distance between the at least two light points in the second direction and a distance to the surface on which the at least two light points are projected; and
        estimating, with the at least one image processor, an average distance to the surface on which the at least two light points are projected based on the first and second distances to the surface on which the at least two light points are projected.

2. The distance estimation system of claim 1, wherein the operations further comprise:
    capturing, with a second image sensor, a second image of the at least two light points projected on the surface by the at least one laser light emitter simultaneously to the first image captured by the first image sensor;
    extracting, with the at least one image processor, a second distance in the first direction between the at least two light points in the second image;
    determining, with the at least one image processor, a median distance between the at least two light points based on the first distance and the second distance between the at least two light points in the first direction; and
    estimating, with the at least one image processor, a median distance to the surface on which the at least two light points are projected based on the median distance between the at least two light points in the first direction and the predetermined relationship relating the distance between the at least two light points in the first direction and the distance to the surface on which the at least two light points are projected.

3. The distance estimation system of claim 1, wherein the components of the distance estimation system are mounted on a frame.

4. The distance estimation system of claim 3, wherein the frame with mounted components is coupled to a rotatable base such that the frame with mounted components is rotatable in any direction within a plane.

5. The distance estimation system of claim 1, wherein the at least two light points are projected by at least two separate laser light emitters positioned such that respective at least two laser beams of the at least two separate laser light emitters converge at a convergence distance.

6. The distance estimation system of claim 5, wherein the at least two laser beams have different wavelengths.

7. The distance estimation system of claim 1, wherein the operations further comprise:
    identifying, with the image processor, a wavelength associated with each of the at least two light points in the first image;
    determining, with the image processor, if the at least two laser beams of the two separate laser light emitters are converging or diverging based on the wavelength associated with each of the at least two light points in the first image; and
    adjusting, with the image processor, the first distance to the surface on which the at least two light points are projected by summating the first distance to the surface with the convergence distance when the at least two laser beams diverge.

8. The distance estimation system of claim 1, wherein the first direction is horizontal and the second direction is vertical or wherein the first direction is vertical and the second direction is horizontal.

9. The distance estimation system of claim 1, wherein extracting the first distance between the two light points in the first image comprises:

identifying, with the at least one image processor, the at least two light points in the first image using pixel data of the first image.

10. The distance estimation system of claim 9, wherein the pixel data comprises at least one of: pixel position and pixel brightness.

11. The distance estimation system of claim 1, wherein the distance estimation system further comprises a band-pass filter to limit the allowable light.

12. A distance estimation device, comprising:
at least one laser light emitter;
at least one image sensor;
at least one image processor; and
a tangible, non-transitory, machine readable medium storing instructions that when executed by the image processor effectuates operations comprising:
  capturing, with a first image sensor, a first set of images of at least one light point projected on a surface by the at least one laser light emitter;
  extracting, with the at least one image processor, the at least one light point in the first set of images using pixel data;
  determining, with the at least one image processor, a first change in position of the at least one light point in consecutively captured images of the first set of images; and
  estimating, with the image processor, a first change in distance to the surface on which the at least one light point is projected based on at least the first change in position of the at least one light point.

13. The distance estimation device of claim 12, wherein the operations further comprise:
  capturing, with a second image sensor, a second set of images of the at least one light point projected on the surface by the at least one laser light emitter simultaneously to the first set of images captured by the first image sensor;
  extracting, with the at least one image processor, the at least one light point in the second set of images using pixel data;
  determining, with the at least one image processor, a second change in position of the at least one light point in consecutively captured images of the second set of images; and
  determining, with the at least one image processor, a median change in position of the at least one light point based on the first change in position and the second change in position of the at least one light point; and,
  estimating, with the image processor, a median change in distance to the surface on which the at least one light point is projected based on the median change in position of the at least one light point.

14. The distance estimation device of claim 12, wherein the components of the distance estimation device are mounted on a frame.

15. The distance estimation device of claim 14, wherein the frame with mounted components is coupled to a rotatable base such that the frame with mounted components is rotatable in any direction within a plane.

16. The distance estimation device of claim 12, wherein the at least one light point is projected by at least one laser light emitter positioned at an angle relative to at least one of: a horizontal plane and a vertical plane.

17. The distance estimation device of claim 12, wherein the at least one light point displaces in a horizontal and a vertical direction.

18. The distance estimation device of claim 12, wherein the pixel data comprises at least a pixel position and a pixel brightness.

19. The distance estimation device of claim 12, wherein the distance estimation device further comprises a band-pass filter to limit the allowable light.

* * * * *